United States Patent
Edwards et al.

(10) Patent No.: US 11,361,277 B2
(45) Date of Patent: Jun. 14, 2022

(54) INTEGRATED CONTAINER CONVEYANCE SYSTEM

(71) Applicant: Walmart Apollo, LLC, Bentonville, AR (US)

(72) Inventors: James Benjamin Edwards, Fayetteville, AR (US); Brian C. Roth, Bentonville, AR (US); Paul Durkee, Centerton, AR (US); Ragen Turner, Bentonville, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 232 days.

(21) Appl. No.: 16/436,884

(22) Filed: Jun. 10, 2019

(65) Prior Publication Data

US 2020/0283229 A1 Sep. 10, 2020

Related U.S. Application Data

(60) Provisional application No. 62/814,508, filed on Mar. 6, 2019.

(51) Int. Cl.
*G06Q 10/08* (2012.01)
*H04W 4/35* (2018.01)
(Continued)

(52) U.S. Cl.
CPC ............ *G06Q 10/087* (2013.01); *B25J 5/007* (2013.01); *B25J 11/008* (2013.01); *B65G 1/0492* (2013.01); *B65G 1/1373* (2013.01); *B66F 9/063* (2013.01); *G01K 1/024* (2013.01); *G05B 19/41895* (2013.01); *G05D 1/0212* (2013.01);
(Continued)

(58) Field of Classification Search
CPC ...................................................... H04W 4/35
See application file for complete search history.

(56) References Cited

U.S. PATENT DOCUMENTS 3,908,800 A * 9/1975 Drapeau ................ G06Q 10/08
186/56
6,895,301 B2 5/2005 Mountz
(Continued)

FOREIGN PATENT DOCUMENTS

CN 108408315 A 8/2018

OTHER PUBLICATIONS

Unknown, "BMW Logistics Using Autonomous Transport Robots", Supply Chain 24/7, Logistyx Technologies, https://www.supplychain247.com/article/bmw_logistics_using_autonomous_transport_robots, capture Mar. 13, 2019, pp. 1-8.

(Continued)

*Primary Examiner* — Thomas Randazzo

(57) ABSTRACT

Examples provide a tote conveyance system for autonomously conveying totes from a storage system to a pickup/receiving area via smart container transport carts. The smart container conveyance cart aligns with the induction station on the storage system. The system utilizes actuators to move totes onto the cart from an induction station on the storage system or move totes off the cart into the induction station. Loading or unloading of totes are performed in accordance with priorities assigned based on cold-chain compliance temperature thresholds associated with the contents of the totes, weights of the totes, and destination of totes.

20 Claims, 13 Drawing Sheets

(51) Int. Cl.

| | | |
|---|---|---|
| *H04W 4/38* | (2018.01) | |
| *G05B 19/418* | (2006.01) | |
| *B25J 5/00* | (2006.01) | |
| *B65G 1/04* | (2006.01) | |
| *B25J 11/00* | (2006.01) | |
| *G05D 1/02* | (2020.01) | |
| *B65G 1/137* | (2006.01) | |
| *B66F 9/06* | (2006.01) | |
| *G01K 1/024* | (2021.01) | |

(52) U.S. Cl.
 CPC ............ *H04W 4/35* (2018.02); *H04W 4/38* (2018.02); *G05D 2201/0216* (2013.01)

(56) References Cited

U.S. PATENT DOCUMENTS

| | | | |
|---|---|---|---|
| 8,718,814 | B1 | 5/2014 | Clark et al. |
| 9,120,622 | B1 | 9/2015 | Elazary et al. |
| 9,663,293 | B2 | 5/2017 | Wurman et al. |
| 9,802,759 | B2 | 10/2017 | Lert, Jr. |
| 10,549,915 | B1* | 2/2020 | Theobald ............. G05D 1/0088 |
| 10,954,067 | B1* | 3/2021 | Theobald ............... B25J 19/022 |
| 2007/0129849 | A1* | 6/2007 | Zini .................... G05D 1/0261 |
| | | | 700/258 |
| 2010/0327052 | A1* | 12/2010 | Iwakawa ................ G01K 1/024 |
| | | | 374/E1.001 |
| 2012/0321423 | A1 | 12/2012 | MacKnight et al. |
| 2017/0330269 | A1* | 11/2017 | Kanellos ................ B65G 1/137 |
| 2018/0043547 | A1 | 2/2018 | Hance et al. |
| 2018/0057265 | A1 | 3/2018 | Manpat |
| 2018/0082279 | A1* | 3/2018 | Vasgaard ............. G06Q 10/087 |
| 2018/0195869 | A1* | 7/2018 | High .................. G01C 21/3453 |
| 2018/0237221 | A1* | 8/2018 | Lindbo ................ B65G 1/0464 |
| 2018/0326886 | A1* | 11/2018 | Sibley .................. A47G 29/141 |
| 2018/0365964 | A1* | 12/2018 | Carson .................. G01J 1/0219 |
| 2019/0006037 | A1* | 1/2019 | Jacobs ............... G06Q 10/0833 |
| 2019/0263589 | A1* | 8/2019 | Clarke .................... G06F 1/3203 |
| 2019/0272496 | A1* | 9/2019 | Moeller ............... G06Q 10/087 |
| 2019/0310646 | A1* | 10/2019 | DeJarnette ........... H04W 4/021 |
| 2020/0223632 | A1* | 7/2020 | Melanson ............... G06F 21/33 |

OTHER PUBLICATIONS

Unknown, "MiR500 mobile cobots make traffic safer in Kverneland's factory", Kverneland Group Denmark, https://www.mobile-industrial-robots.com/pl/resources/case-studies/mir500-cobot-increases-safety-in-kvernelands-dynamic-environment/, copyright 2016, 5 pages.

Young, Lee, "International Search Report", International Application No. PCT/US2020/021307, dated Jul. 27, 2020, 4 pages.

Young, Lee, "Written Opinion", International Application No. PCT/US2020/021307, dated Jul. 27, 2020, 6 pages.

\* cited by examiner

INTEGRATED CONTAINER CONVEYANCE SYSTEM

BACKGROUND

Totes and other containers are frequently utilized to transport items from a storage location to a pickup location. These containers are typically transported manually by one or more users. In some of these solutions, a user manually carries a tote to a pick-up or drop-off point and places the tote into a receptacle, receiving platform or other entry point of the storage location or retrieves the tote from the receptacle or other exit platform. This is a time-consuming, labor intensive and inefficient process.

SUMMARY

Some examples provide a system for integrated container conveyance. The system includes a smart container conveyance cart including a set of totes associated with a set of shelves on the smart container conveyance cart. A set of sensor devices scans an identifier on a first tote to identify the first tote for unloading into an induction station on a container storage. A set of actuator devices associated with the smart container conveyance cart are configured to move the identified tote off at least one shelf in the set of shelves of the smart container conveyance cart onto a receiving platform of the induction station. A cart controller component analyzes sensor data generated by the set of sensors to verify induction of the first tote into the container storage.

A computer implemented method for integrated container conveyance. A set of sensor devices scans a tote located on a smart container conveyance cart for induction into a container storage at a selected induction station. The tote is identified based on sensor data generated based on scanning of a tote ID associated with the identified tote. A cart controller component aligns the cart with the selected induction station for transfer of the identified tote from the cart onto the induction station. A set of actuators moves the identified tote off a surface of at least one shelf of the smart container conveyance cart onto a receiving area of the induction station associated with the container storage.

An integrated container conveyance device including a cart comprising a set of shelves configured to accommodate a set of totes and a docking member on the cart. A robotic cart towing device attaches or otherwise connects to the docking member to tow the cart. The robotic cart towing device includes a control device and a motor for self-propulsion and self-navigation. A docking mechanism associated with the robotic cart towing device is configured to connect to the docking member on the cart. A cart control device aligns the cart with an induction station on the container storage. A set of actuators associated with the cart configured to load at least one tote onto the cart or unload at least one tote off the cart at an induction station.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Corresponding reference characters indicate corresponding parts throughout the drawings.

DETAILED DESCRIPTION

A more detailed understanding can be obtained from the following description, presented by way of example, in conjunction with the accompanying drawings. The entities, connections, arrangements, and the like that are depicted in, and in connection with the various figures, are presented by way of example and not by way of limitation. As such, any and all statements or other indications as to what a particular figure depicts, what a particular element or entity in a particular figure is or has, and any and all similar statements, that can in isolation and out of context be read as absolute and therefore limiting, can only properly be read as being constructively preceded by a clause such as "In at least some examples, . . . " For brevity and clarity of presentation, this implied leading clause is not repeated ad nauseum.

Figure 1:
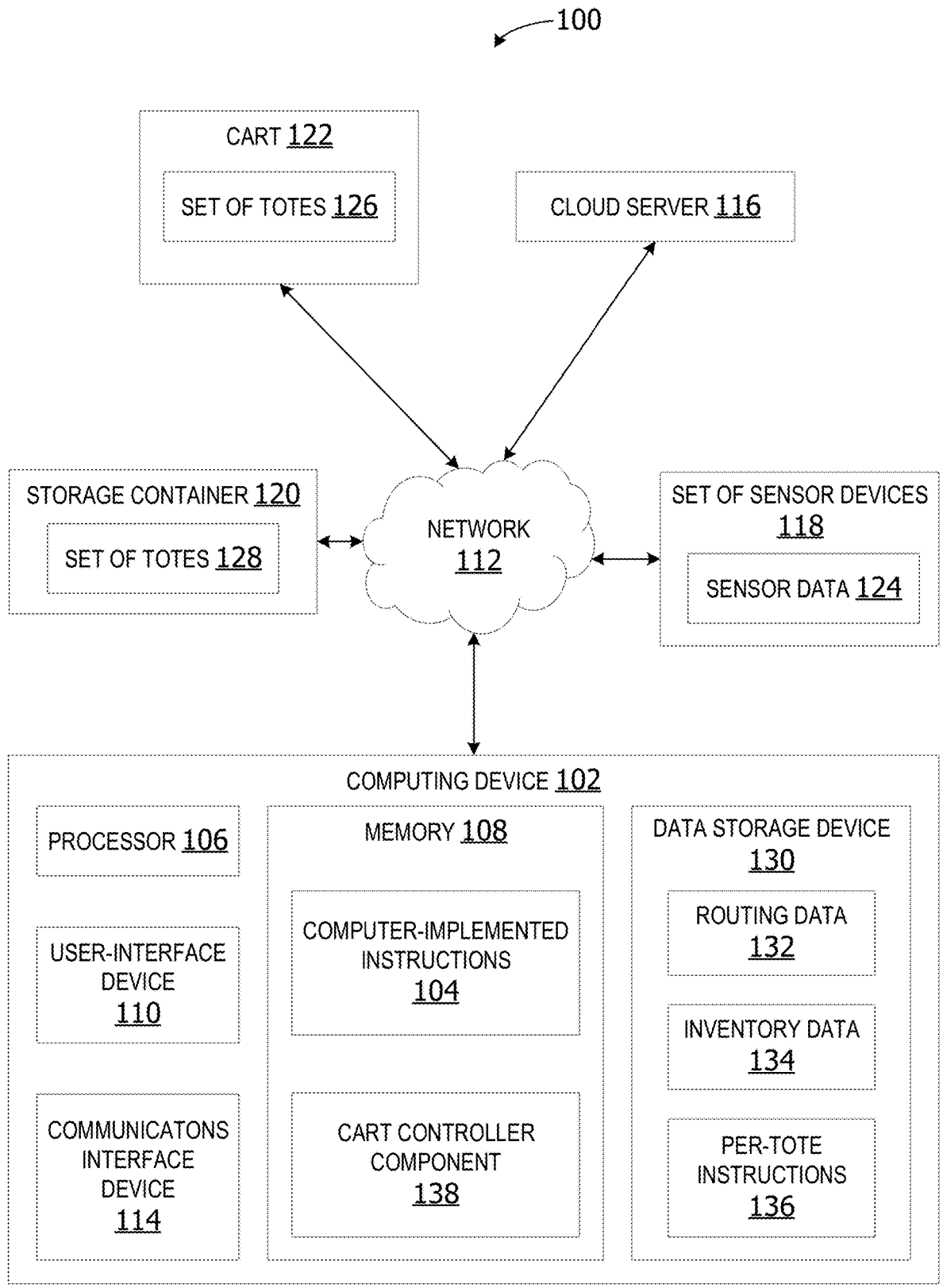
FIG. 1 is an exemplary block diagram illustrating a system for an autonomous container transport system compatible with an induction point on a container storage device.

Referring again to FIG. 1, an exemplary block diagram illustrates a system 100 for an autonomous container transport system compatible with an induction point on a container storage device. In the example of FIG. 1, the computing device 102 represents any device executing computer-executable instructions 104 (e.g., as application programs, operating system functionality, or both) to implement the operations and functionality associated with the computing device 102. The computing device 102 in some examples includes a mobile computing device or any other portable device. A mobile computing device includes, for example but without limitation, a mobile telephone, laptop, tablet, computing pad, netbook, gaming device, and/or portable media player. The computing device 102 can also include less-portable devices such as servers, desktop personal computers, kiosks, or tabletop devices. Additionally, the computing device 102 can represent a group of processing units or other computing devices.

In some examples, the computing device 102 has at least one processor 106 and a memory 108. The computing device 102 in other examples includes a user interface device 110.

The processor 106 includes any quantity of processing units and is programmed to execute the computer-executable instructions 104. The computer-executable instructions 104 is performed by the processor 106, performed by multiple processors within the computing device 102 or performed by a processor external to the computing device 102. In some examples, the processor 106 is programmed to execute instructions such as those illustrated in the figures (e.g., FIG. 16, FIG. 17 and FIG. 18).

The computing device 102 further has one or more computer-readable media such as the memory 108. The memory 108 includes any quantity of media associated with or accessible by the computing device 102. The memory 108 in these examples is internal to the computing device 102 (as shown in FIG. 1). In other examples, the memory 108 is external to the computing device (not shown) or both (not shown). The memory 108 can include read-only memory and/or memory wired into an analog computing device.

The memory 108 stores data, such as one or more applications. The applications, when executed by the processor 106, operate to perform functionality on the computing device 102. The applications can communicate with counterpart applications or services such as web services accessible via a network 112. In an example, the applications represent downloaded client-side applications that correspond to server-side services executing in a cloud.

In other examples, the user interface device 110 includes a graphics card for displaying data to the user and receiving data from the user. The user interface device 110 can also include computer-executable instructions (e.g., a driver) for operating the graphics card. Further, the user interface device 110 can include a display (e.g., a touch screen display or natural user interface) and/or computer-executable instructions (e.g., a driver) for operating the display. The user interface device 110 can also include one or more of the following to provide data to the user or receive data from the user: speakers, a sound card, a camera, a microphone, a vibration motor, one or more accelerometers, a BLUETOOTH® brand communication module, global positioning system (GPS) hardware, and a photoreceptive light sensor. In a non-limiting example, the user inputs commands or manipulates data by moving the computing device 102 in one or more ways.

The network 112 is implemented by one or more physical network components, such as, but without limitation, routers, switches, network interface cards (NICs), and other network devices. The network 112 is any type of network for enabling communications with remote computing devices, such as, but not limited to, a local area network (LAN), a subnet, a wide area network (WAN), a wireless (Wi-Fi) network, or any other type of network. In this example, the network 112 is a WAN, such as the Internet. However, in other examples, the network 112 is a local or private LAN.

In some examples, the system 100 optionally includes a communications interface device 114. The communications interface device 114 includes a network interface card and/or computer-executable instructions (e.g., a driver) for operating the network interface card. Communication between the computing device 102 and other devices, such as but not limited to the cloud server 116, the set of sensor devices 118, the container storage 120 and/or the cart 122, can occur using any protocol or mechanism over any wired or wireless connection. In some examples, the communications interface device 114 is operable with short range communication technologies such as by using near-field communication (NFC) tags.

The cloud server 116 is implemented as one or more virtual servers (logical server) implemented in a cloud platform or other cloud computing environment. The cloud server 116 can optionally include a cloud storage or other services provided via the network 112.

The set of sensor devices 118 is a set of one or more sensor devices generating sensor data 124. The set of sensor devices 118 can include one or more sensor devices on the cart 122 and/or one or more sensor devices on the container storage 120 system. In some examples, the set of sensor devices 118 includes one or more cameras for capturing images of a tote or part of a tote in the set of totes 126 on the cart 122 or at least a portion of a tote in the set of totes 128 associated with the container storage.

The cart 122 is an automated mobile robotic conveyance device for moving the set of totes from the container storage to a remote location, such as, but not limited to, a pickup location, a kiosk, a truck, a warehouse, a distribution center, a portion of a retail store, or any other destination/receiving location for the set of totes 126. In some examples, the cart 122 is a self-propelled smart cart. In other examples, a robotic cart towing device docks with a cart to propel/guide the cart.

The set of totes can include one or more totes. In other examples, the set of totes can include a null set. A tote in the set of totes 126 can be an empty tote or a tote holding/storing one or more items.

The container storage 120 is a device or system for storing a set of one or more totes 128. The container storage 120 in some non-limiting examples is an automated tote storage system. The container storage 120 can include, without limitation, a set of shelves, cubes, a portion of a warehouse, a portion of a distribution center, or any other container storage.

The container storage 120 can optionally include temperature-controlled areas for storing perishable items having cold-chain compliance requirements for maintaining freshness.

The system 100 can optionally include a data storage device 130 for storing data, such as, but not limited to routing data 132, inventory data 134 and/or per-tote instructions 136. The routing data 132 is data including maps, directions, or routing instructions for traversing a distance between the container storage 120 and a destination point, such as, but not limited to, a truck to transport the cart 122 to another location, a sales floor of a store, a pickup area for customers to pick up a tote containing order fulfillment items for fulfilling an online order made by the customer, or any other type of destination.

The inventory data 134 is data comprising an inventory of the cart 122. The inventory can optionally include an identification (ID) of totes in the set of totes 126 currently present on the cart 122, an inventory of items in each tote in the set of totes currently present on the cart 122, and/or an inventory of totes to be picked up and placed/loaded onto the cart 122.

The per-tote instructions 136 optionally includes data associated with instructions for handling, transporting, monitoring, loading, unloading and/or transporting totes on the cart 122. For example, the per-tote instructions 136 can include orientation instructions specifying the correct orientation of totes on the cart so that a port, handle or other device on the tote is positioned correctly relative to the cart and/or other totes on the cart. The per-tote instructions 136 can include temperature thresholds specifying acceptable temperature range for cold-chain compliant items within one or more of the totes in the set of totes 126, destination of one or more of the totes, etc.

The data storage device 130 can include one or more different types of data storage devices, such as, for example, one or more rotating disks drives, one or more solid state drives (SSDs), and/or any other type of data storage device. The data storage device 130 in some non-limiting examples includes a redundant array of independent disks (RAID) array. In other examples, the data storage device 130 includes a database.

The data storage device 130 in this example is included within the computing device 102 or associated with the computing device 102. In other examples, the data storage device 130 includes a remote data storage accessed by the computing device via the network 112, such as a remote data storage device, a data storage in a remote data center, or a cloud storage.

The memory 108 in some examples stores one or more computer-executable components. Exemplary components include a cart controller component 138 for controlling auto-navigation of the cart, autonomous loading of totes onto the cart, autonomous unloading of totes off the cart, turning/rotating the cart to correctly position/orient totes loading onto the cart, controlling actuators for manipulating/moving totes onto and off the cart, analyzing sensor data to monitor totes on the cart, etc.

In some examples, the cart controller component 138 interfaces the carts with the induction point of an automated storage system. The cart controller 138 in a non-limiting example, integrates automated transportation of containers of goods (totes) from the aisles of a retail store or other location to an induction system where they are stored for future retrieval either to be picked-from to compile a customer's order, or to be dispensed as they are for a customer's order.

In this example, the cart controller component 138 is implemented on a computing device, such as a server. In other examples, the cart controller component 138 is implemented on the cart 122, the cloud server, the container storage or other computing device.

Figure 2:
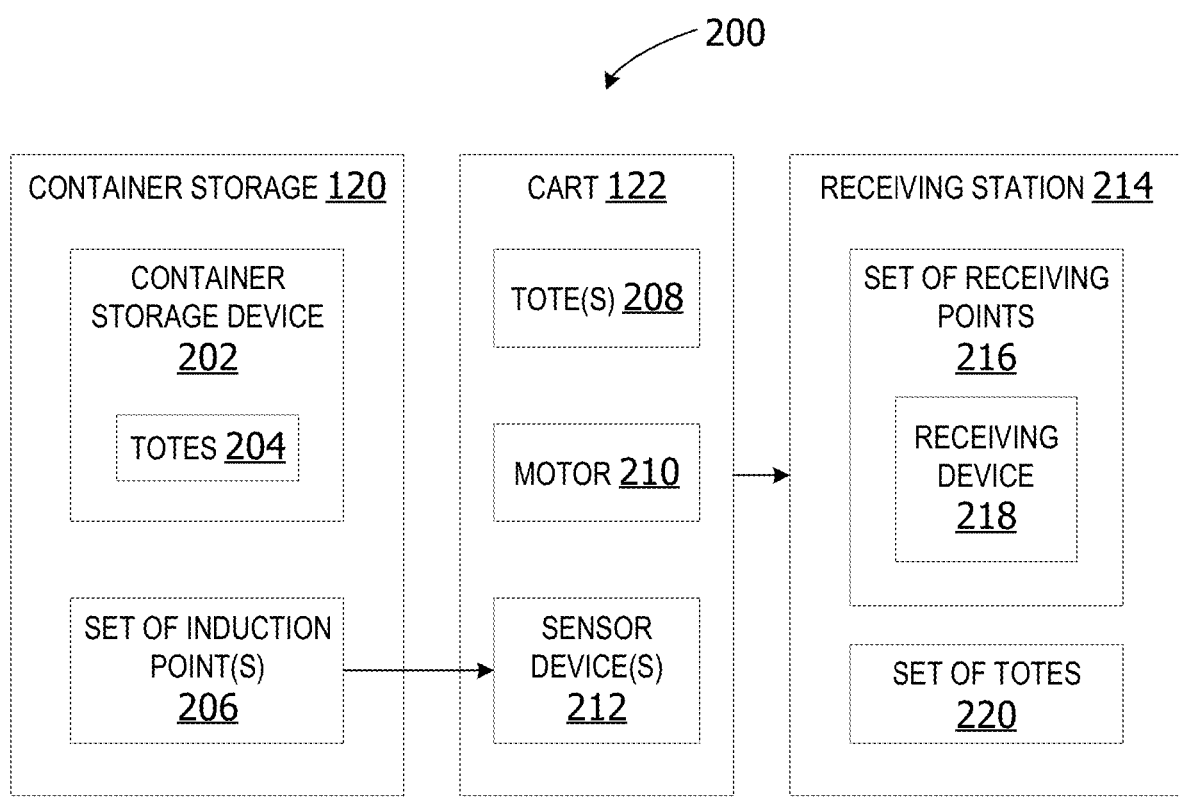
FIG. 2 is an exemplary block diagram illustrating a system for automatically loading and unloading totes onto a cart compatible with a set of induction points on an automated container storage.

FIG. 2 is an exemplary block diagram illustrating a system 200 for automatically loading and unloading totes onto a cart 122 compatible with a set of induction points on an automated container storage 120. The container storage in this example includes a container storage device 202 for storing one or more totes 204. The totes 204 include one or more containers for storing one or more items, such as, but not limited to, the set of totes 126 in FIG. 1.

The container storage 120 includes a set of one or more induction points 206. An induction point is a location, area, window, opening, tray, door or other location at which a tote can be inserted, pushed, pulled, placed or otherwise returned into the storage or received/removed from the storage. In other words, an induction point is an entry or exit point for placing a tote into the container storage 120 system or removing a tote from the container storage.

The cart 122 is compatible with the container storage. The cart 122 is capable of docking, connecting or aligning with one or more induction points to smoothly and automatically receive (retrieve) totes from the storage or place totes into the storage (induct), such as, but not limited to, the one or more totes 208.

The cart 122 in this example is a smart cart having a motor 210 enabling the cart 122 to self-navigate. In other words, the cart 122 is self-propelled and capable of autonomous movement without human assistance.

The cart 122 includes one or more sensor devices 212 generating sensor data. The sensor devices 212 include one or more sensor devices, such as, but not limited to, the set of sensor devices 118 in FIG. 1.

The cart 122 delivers the totes 208 to a receiving station 214 in some examples. The receiving station 214 can be implemented as a stand-alone pickup building, facility, area, truck (trailer), transport vehicle or pickup kiosk. The receiving station 214 can optionally also include a set of one or more item lockers for storing one or more totes for pickup by a user. The receiving station in some non-limiting examples is a small footprint site where full totes/totes stocked with grocery order fulfillment items. These stocked totes are inducted into the receiving station 214. The stocked totes are then dispensed from the receiving station to customers wishing to retrieve their grocery orders. The system utilizes the carts to retrieve empty totes from the receiving station 214 and return the empty totes to the container storage 120. This permits customers to pick up (dispense) grocery or other item orders that are filled at a different location.

The receiving station 214 in this non-limiting example includes a set of one or more receiving points 216. A receiving point is an area, window, tray, opening or entry point in the receiving station in which a tote is pushed, pulled or placed into the receiving station 214.

The cart 122 docks, attaches or otherwise aligns with at least one receiving point to transfer a tote to a receiving device 218. The receiving device 218 is a device that receives a tote and pulls, pushes, lifts or otherwise receives the tote. The receiving device 218 in some examples includes a conveyor belt, an actuator or other device for moving or attaching to the tote. The actuator may include a robotic arm, clamp, sweeper arm, or other device for moving the set of one or more totes 220 within the receiving station 214. The cart can be a separate device from the conveyor belt system.

Figure 3:
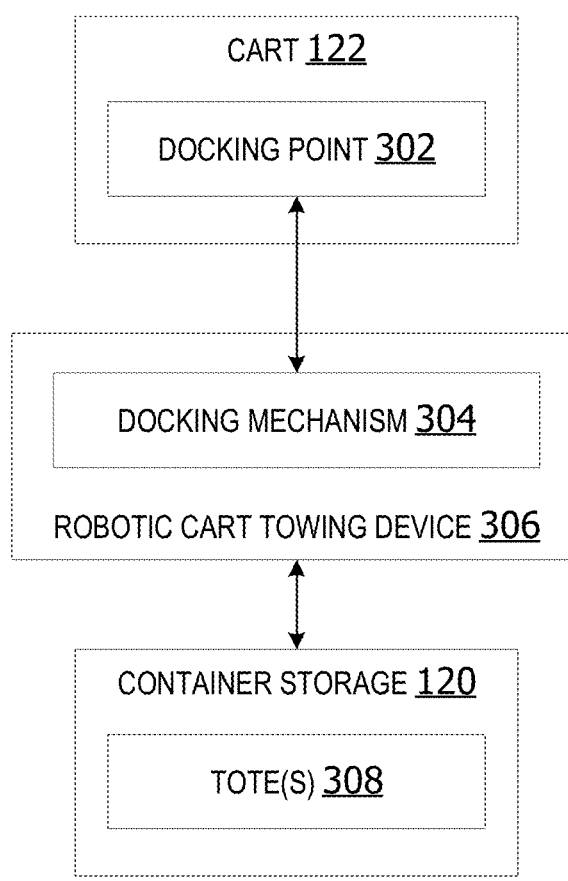
FIG. 3 is an exemplary block diagram illustrating a cart transport robot docking with a docking point on a cart.

FIG. 3 is an exemplary block diagram illustrating a cart transport robot docking with a docking point 302 on a cart 122. The docking point 302 is a position on a cart at which a docking mechanism 304 of a robotic cart towing device 306 can attach to the cart 122. The docking point 302 in some examples is a rim, ridge, hook, clamp, handle, port, couple or other attachment means. The docking mechanism 304 is a device on the robotic cart towing device 306 compatible with the docking point 302 on the cart 122. The docking mechanism 304 can be implemented as one or more clamps, ports, hooks, locking devices, magnets, or any other devices for connecting the robotic cart towing device to the cart 122.

The robotic cart towing device 306 is a self-propelled robot capable of attaching to a cart and pulling it, pushing it or otherwise guiding it from a first location to a second location. The robotic cart towing device 306 in some examples includes a navigation system, motor, a set of one or more wheels, one or more batteries and/or a set of sensor devices. The robotic cart towing device 306 moves the cart 122 from the container storage 120 to the receiving station or other destination. The container storage 120 stores one or more totes 308 for retrieval by the system and delivery to a recipient or pickup location, such as the receiving station.

Figure 4:
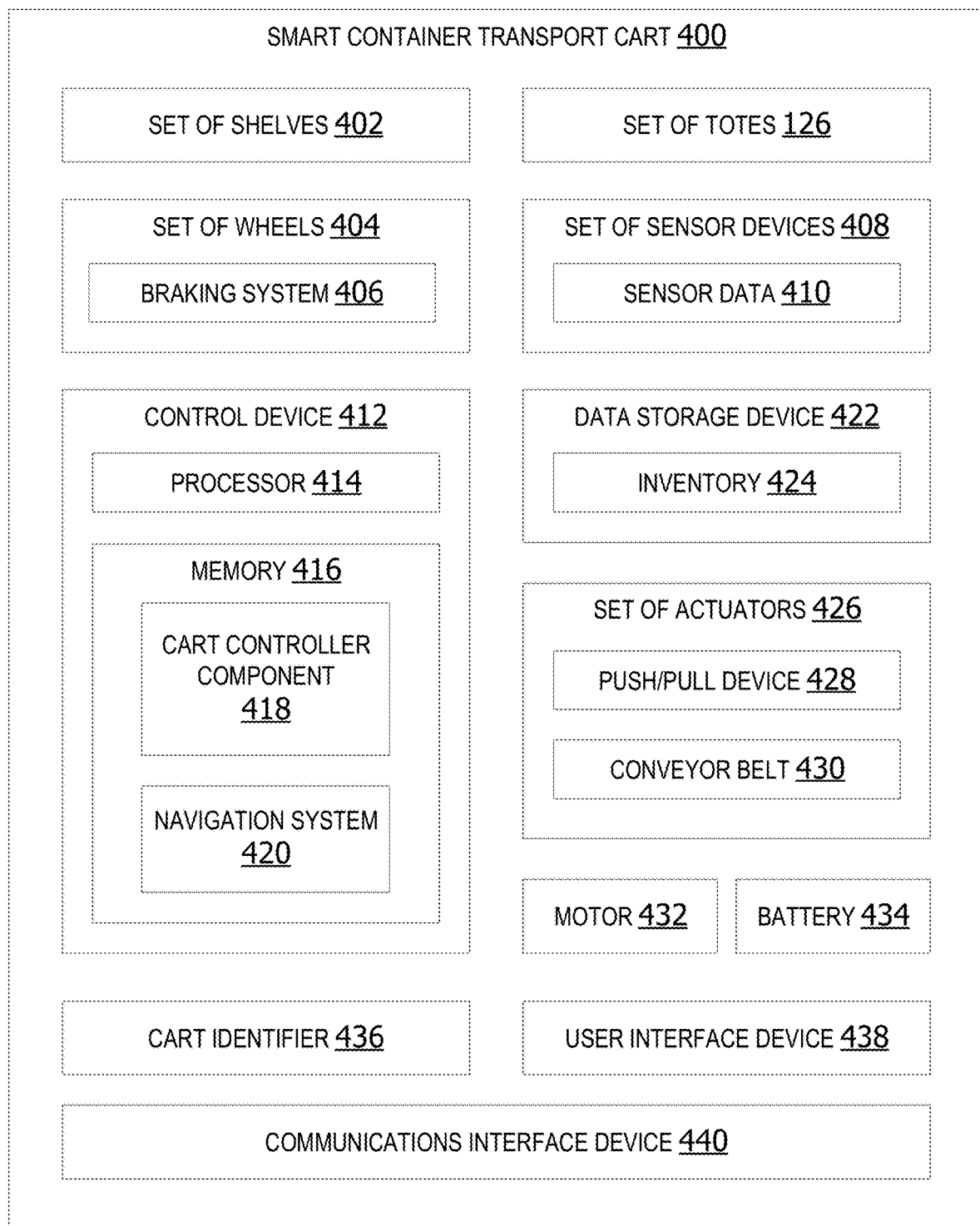
FIG. 4 is an exemplary block diagram illustrating a smart container transport cart for conveying a set of totes associated with a container storage.

FIG. 4 is an exemplary block diagram illustrating a smart container transport cart 400 for conveying a set of totes associated with a container storage. The smart container transport cart 400 is a smart cart for conveying a set of one or more totes 126 to a storage container or away from a storage container 120, such as, but not limited to, the cart 122 in FIG. 1.

The cart includes a set of one or more shelves 402 for storing/supporting one or more totes during transport. A set of one or more wheels 404 enables the cart to roll or move from one location to another. The set of wheels is associated with a braking system 406 for stopping the set of wheels 404 from turning. The set of wheels can optionally also include a parking brake.

A set of one or more sensor devices 408 on the cart generates sensor data 410 associated with the set of totes 126 on the cart, a tote being loaded onto the cart and/or a tote being unloaded off the cart. The set of sensor devices 408 includes one or more sensor devices, such as, but not limited to, the set of sensor devices 118 in FIG. 1 and FIG. 15.

A control device 412 on the cart controls the auto-navigation of the cart. The control device 412 includes at least one processor 414 and a memory 416. The memory 416 stores a cart controller component 418 which analyzes the sensor data to identify each tote placed onto the cart and/or each tote unloaded from off the cart. The cart controller component 418 can also generate routing data, identify a destination of a tote and/or update inventory data associated with an inventory of totes or items on the cart.

The memory 416 can also include a navigation system 420. The navigation system 420 navigates the smart container transport cart 400 along a route from a point of departure to a destination. In other words, the route may be a path from the container storage to a destination (receiving station) or a path from the receiving station (destination) back to the container storage. The destination in other examples can be a truck or other vehicle for transporting the cart to a receiving station or other pickup location (second destination).

The navigation system 420 can also navigate the cart to multiple receiving points (multiple destinations) along a route. In other words, the cart can deliver one or more totes on the cart to two or more different destinations. In one example, the cart can deliver a first tote to a first residence on a given street and deliver a second tote to a second residence on the same street. In this manner, the smart container transport cart 400 delivers totes to multiple destinations along a route from the container storage.

The smart container transport cart 400 can optionally include a data storage device 422 to store data, such as, but not limited to, an inventory 424 of totes and/or items on the cart. The data storage 422 can be implemented as a device, such as, but not limited to, the data storage device 130 in FIG. 1.

The smart container transport cart 400 in some examples includes a set of actuators 426 for moving and/or re-orienting one or more totes on the cart. The set of actuators 426 can include one or more devices for pulling a tote onto the cart and/or pushing a tote off the cart. In some examples, a single actuator moves a tote on or off the cart and/or into and out of the storage system. In other examples, two or more actuators move the tote onto or off of the cart.

In some examples, the set of actuators 426 includes a push/pull device 428 for pushing or pulling a tote. A push/pull device can be implemented as a sweeper arm for pushing a tote. A push/pull device can be implemented as an articulated arm for pulling a tote, a pneumatic suction device, a set of magnets, a set of hydraulic devices, a series of levers, a set of robotic arms or any other mechanism for moving, pushing, lifting or pulling a tote.

The set of actuators 426 in other examples includes one or more conveyor belts, such as, but not limited to, the conveyor belt 430. The conveyor belt 430 can carry or slide a tote onto the cart or off the cart.

The smart container transport cart 400 also includes a motor 432 for turning one or more of the wheels in the set of wheels 404. One or more batteries, such as the battery 434, can also be included for powering the motor. In some examples, the battery 434 is a rechargeable lithium ion battery. In other examples, the battery is a solar powered battery.

A cart identifier 436 on the smart container transport cart 400 is included in some examples. The cart identifier 436 is a unique identifier for identifying each cart in a plurality of carts for moving totes. The cart identifier 436 can be implemented as a radio frequency identifier (RFID) tag, a barcode, a label including a text or numeric identifier, a quick response (QR) code, or any other type of identifier. The system analyzes sensor data associated with the cart identifier 436 to identify each cart. The cart identifier can be used to route each cart to an appropriate destination, load totes onto the correct cart, monitor carts or otherwise manager the tote conveyance via the container transport carts.

In other examples, the cart can include a user interface device 438 for receiving data from a user and/or outputting data to the user. The user interface device can be a device such as, but not limited to, the user interface device 110 in FIG. 1.

The cart can optionally include a communication interface device 440 for connecting to a network. The communication interface device enables the cart to send or receive data via the network. The communication interface device is a device such as, but not limited to, the communication interface device 114 in FIG. 1.

Figure 5:
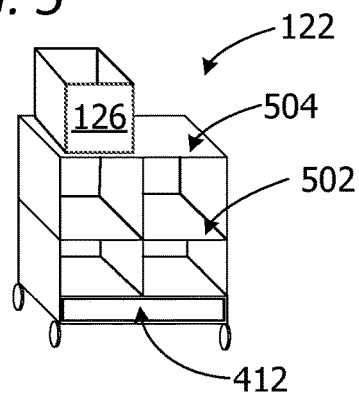
FIG. 5 is an exemplary block diagram illustrating a smart cart having a control device for autonomously conveying totes.

FIG. 5 is an exemplary block diagram illustrating a smart cart 122 having a control device for autonomously conveying totes. The cart 122 includes a control device 412 for controlling the loading and unloading of totes onto the cart without human intervention. The cart 122 includes a set of shelves, such as, but not limited to, the shelf 502 and/or shelf 504. One or more totes can be stored/placed on the set of shelves.

Figure 6:
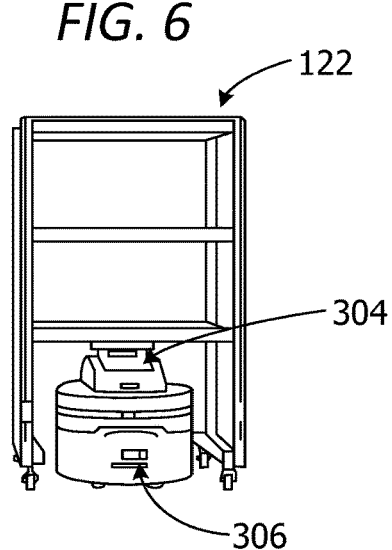
FIG. 6 is an exemplary block diagram illustrating a robotic cart towing device for conveying a cart storing a set of totes.

FIG. 6 is an exemplary block diagram illustrating a robotic cart towing device 306 for conveying a cart 122 storing a set of totes 126. The robotic cart towing device 306 attaches to the cart 122 via a docking mechanism 304.

Figure 7:
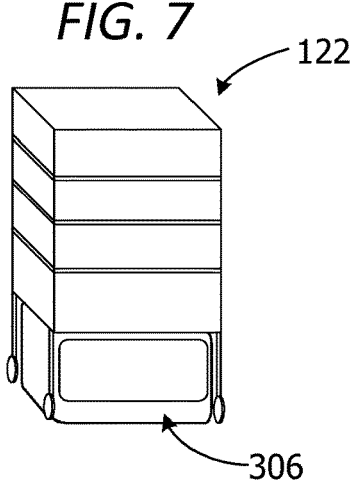
FIG. 7 is an exemplary block diagram illustrating a cart docked to a robotic cart towing device.

FIG. 7 is an exemplary block diagram illustrating a cart 122 docked to a robotic cart towing device 306. The robotic cart towing device 306 tows the cart to the container storage to load totes onto the cart or unload totes off the cart into the container storage.

In this example, the robotic cart towing device 306 docks to an underside of the cart. In this manner, the robotic cart towing device moves the cart from underneath. In other examples, the robotic cart towing device 306 pulls the cart from a position in front of the cart. In still another example, the robotic cart towing device pushes the cart from a position behind the cart.

Figure 8:
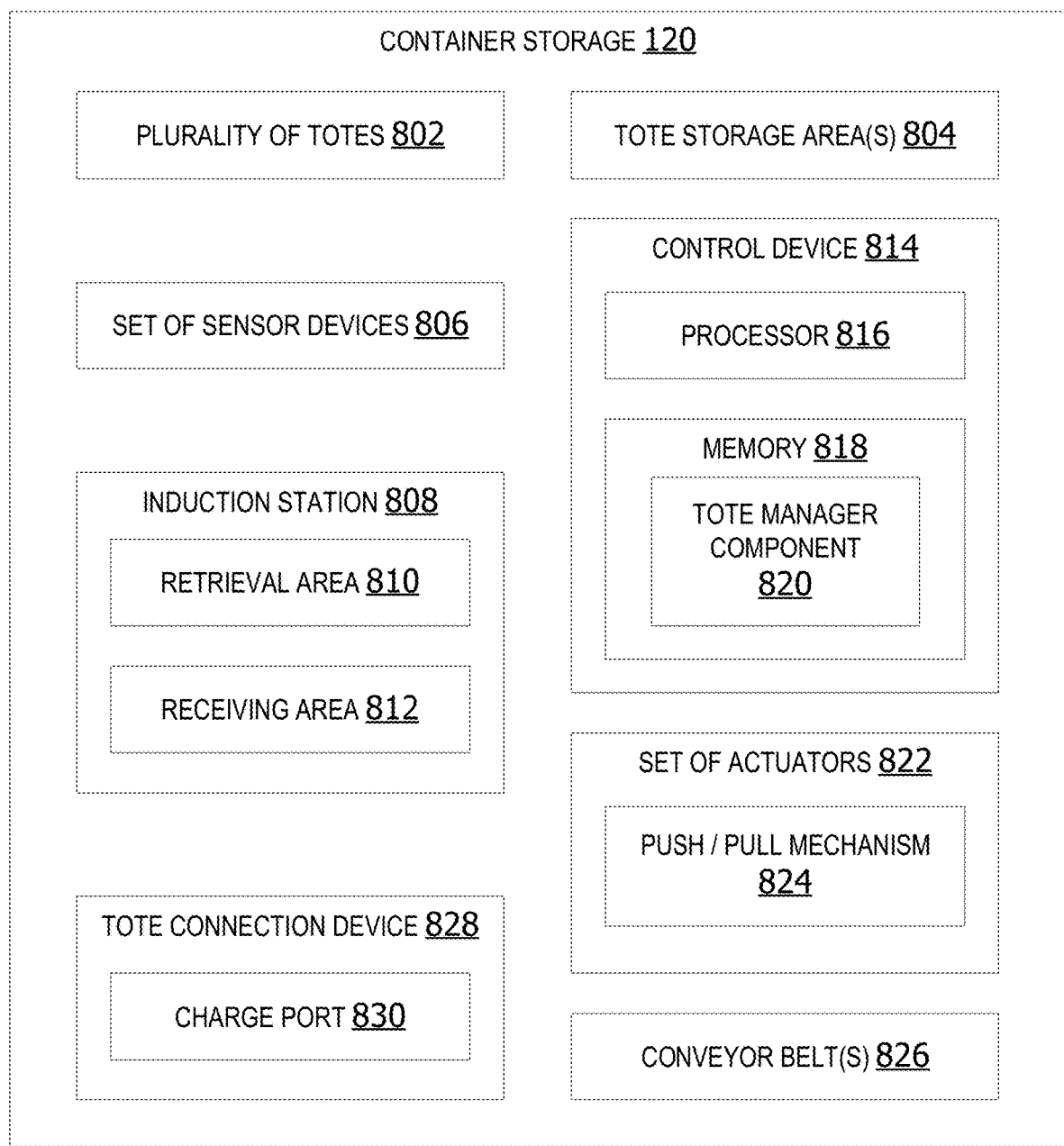
FIG. 8 is an exemplary block diagram illustrating a container storage for storing totes to be unloaded or loaded onto a cart.

FIG. 8 is an exemplary block diagram illustrating a container storage 120 for storing totes to be unloaded or loaded onto a cart. The container storage 120 in some examples stores a plurality of totes 802. A tote in the plurality of totes is any type of tote or container for holding one or more items stored within one or more tote storage area(s) 804 within the container storage 120.

The container storage 120 can include a set of one or more sensor device 806 for generating sensor data associated with one or more totes in the plurality of totes. The sensor devices are devices such as, but not limited to, the set of sensor devices 118 in FIG. 1 and FIG. 15.

An induction station 808 includes one or more induction points for receiving or dispensing a tote. The induction station 808 is the location at which totes are loaded into or pulled out of the storage system.

The induction station 808 can include a window, conveyor belt, portal, tray, or other opening. In some examples, the induction station 808 includes a retrieval area 810 at which totes are retrieved (removed) from the container storage. A receiving area 812 can also be included in some examples. The receiving area is an area in which totes are returned (inserted) into the container storage.

A control device 814 includes at least one processor 816 and a memory 818. The memory 818 includes a tote manager component 820 for retrieving or storing one or more totes. The control device controls where totes are stored within the container storage and which totes to retrieve for loading onto a cart.

The container storage 120 can optionally include a set of actuators 822 for pushing, pulling or otherwise moving one or more totes within the container storage 120. The set of actuators 822 in some examples includes a push/pull mechanism and/or one or more conveyor belt(s) 826 for moving totes.

A tote connection device 828 is optionally included. A tote connection device 828 is a device for connecting to a connector on a tote, such as, but not limited to, a charge port 830 for charging a battery or other device on a tote.

Figure 9:
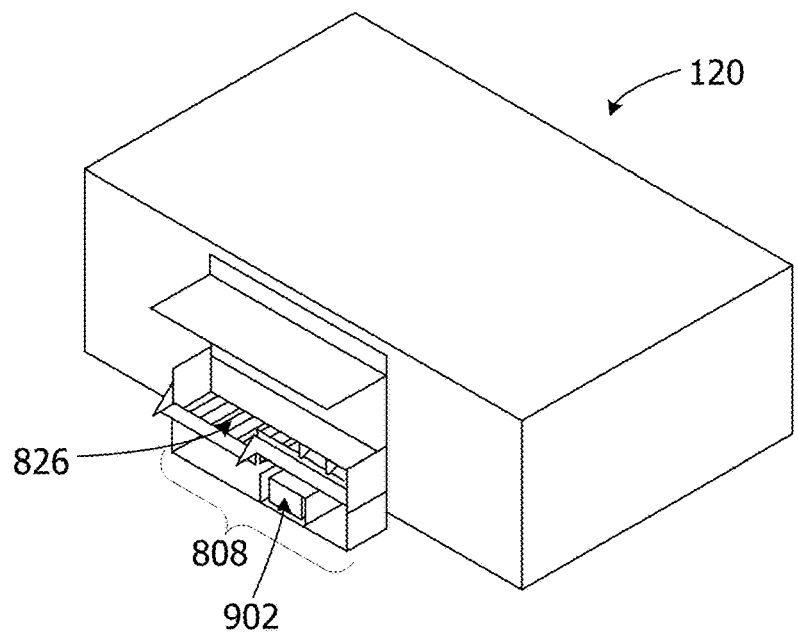
FIG. 9 is an exemplary block diagram illustrating a container storage including an induction station and a user interface.

FIG. 9 is an exemplary block diagram illustrating a container storage 120 including an induction station 808 and a user interface. The user interface is a device for outputting data to a user and/or receiving data from a user. The user interface is a device, such as, but not limited to, the user interface device 110 in FIG. 1.

When a tote 902 is obtained/retrieved from the induction station of the container storage, the tote 902 is output via the conveyor belt(s) 826. The cart lines up with the induction station 808 and autonomously loads the tote onto the cart. Likewise, when the cart returns a tote to the container storage, the cart aligns with the induction station 808 and pushes or moves the tote onto the induction station 808 for return/storage within the container storage.

In this non-limiting example, the cart can automatically dock at induction points on the container storage system. The container storage includes a series of racking to permit tote storage. The system permits automated hand-off of totes into the container storage. The cart pushes totes off one or more shelves of the cart onto the induction station. The cart pulls empty totes from the storage system onto the cart.

In this example, a single tote 902 is being inducted into or out of the container storage via the induction station 808. In other examples, two or more totes can be inducted into the container storage or removed from the container storage simultaneously. In one non-limiting example, the induction station includes slots or induction points for induction of five totes at a single induction station.

The container storage can include one or more induction stations. In one example, the container storage includes two induction stations having five induction slots each for inducting a total of ten totes into the container storage or out of the container storage simultaneously.

In this non-limiting example, the induction station is depicted as a horizontal opening enabling induction of one or more totes. In other examples, the induction station includes an induction drawer having slots for one or more totes inside the drawer. When the drawer opens, one or more totes can be removed through an opening in the side of the drawer. In other examples, the tote(s) are removed through an opening at a top of the drawer or other induction point of the induction station 808.

Figure 10:
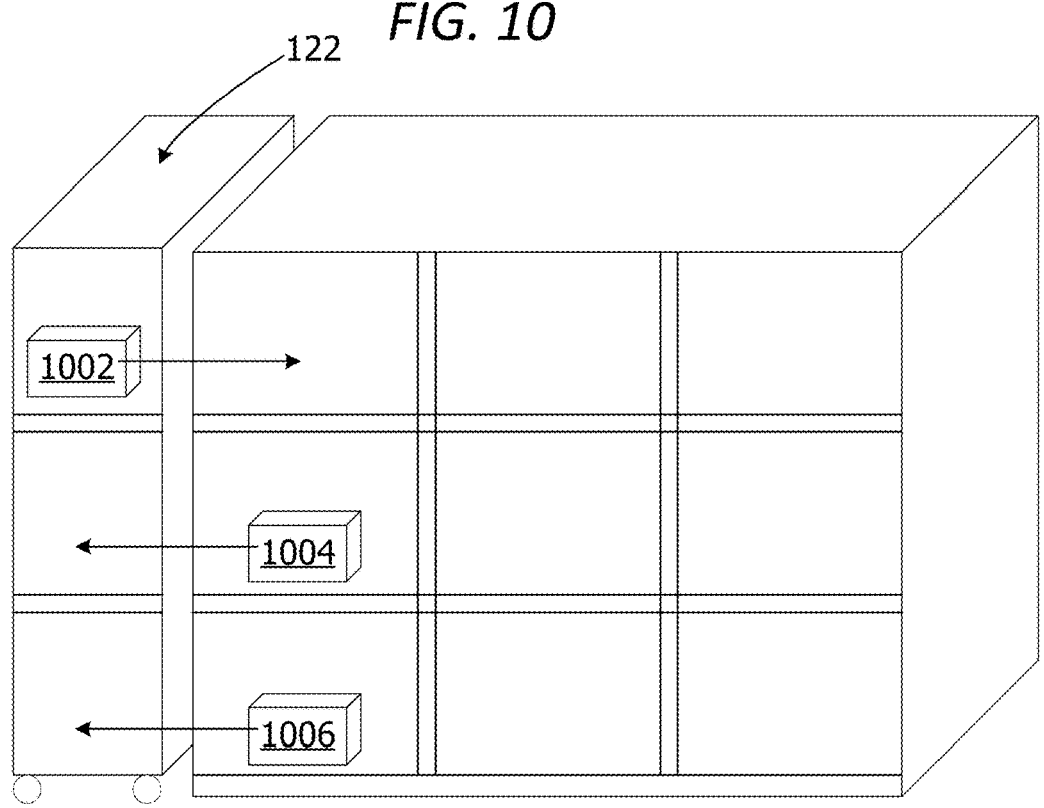
FIG. 10 is an exemplary block diagram illustrating a container storage docking with a cart for loading or unloading a set of totes.

FIG. 10 is an exemplary block diagram illustrating a container storage 120 docking with a cart 122 loading or unloading a set of totes. The smart cart or cart moved by a robotic cart towing device docks with the induction station of the container storage to transfer totes from the cart to the induction station of the container storage. Mechanical means on the cart (actuators) are utilized for pushing totes off the cart into the induction station. Alternatively, the induction station can have mechanical means for reaching out and pulling the totes off the cart. The cart can optionally include conveyors that convey the totes forward and into the induction station. At this time, the system identifies each tote's ID based on sensor data, such as by scanning or capturing an image of a container label on the tote via a camera to confirm the correct tote is loaded or unloaded from the cart.

In this non-limiting example, the tote 1002 is moved from the cart back onto the receiving area of the container storage for storing within the container storage. The tote 1004 and tote 1006 are moved or pushed from the induction station onto the cart for removal from the container storage.

In this example, the induction station is shown as a set of stacked shelves, cubical storage spaces or vertical storage spaces. In other examples, the induction station is a horizontal drawer having a set of induction platforms within the drawer for inducting totes into the container storage. In one example, the induction station is a drawer having five slots for accepting five totes within the drawer arranged horizontally in a row. The drawer slides open to enable placement of totes into the drawer or removal of totes from the drawer. The totes removed from the induction station can be full totes containing one or more items. In other examples, the totes removed from the induction station are empty totes ready for picking/filling.

Figure 11:
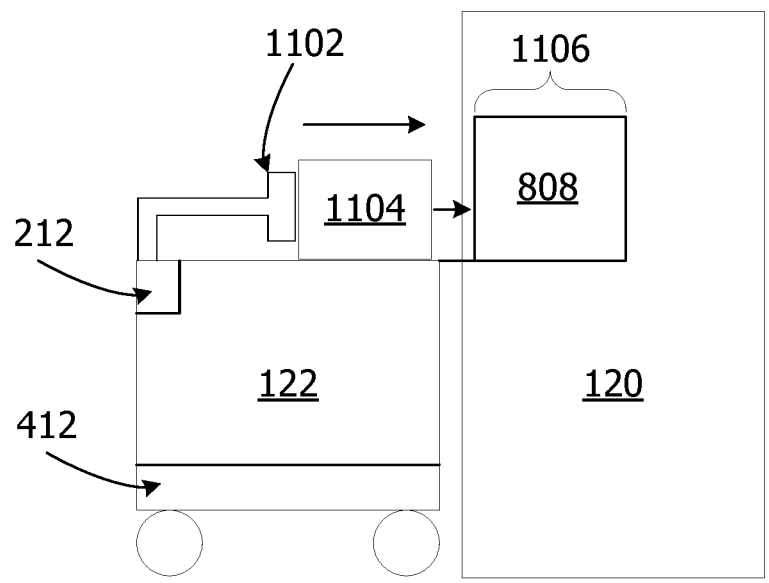
FIG. 11 is an exemplary block diagram illustrating a push mechanism on a cart for loading a tote into an induction station.

FIG. 11 is an exemplary block diagram illustrating a push mechanism 1102 on a cart 122 for loading a tote 1104 into an induction station 808 of a container storage. The push mechanism 1102 in this example is a sweeper arm that pushes the tote 1104 into the receiving area 1106 of the induction station. Push mechanism 1102 is an illustrative example of push/pull device 428 in set of actuators 420 of FIG. 4.

Figure 12:
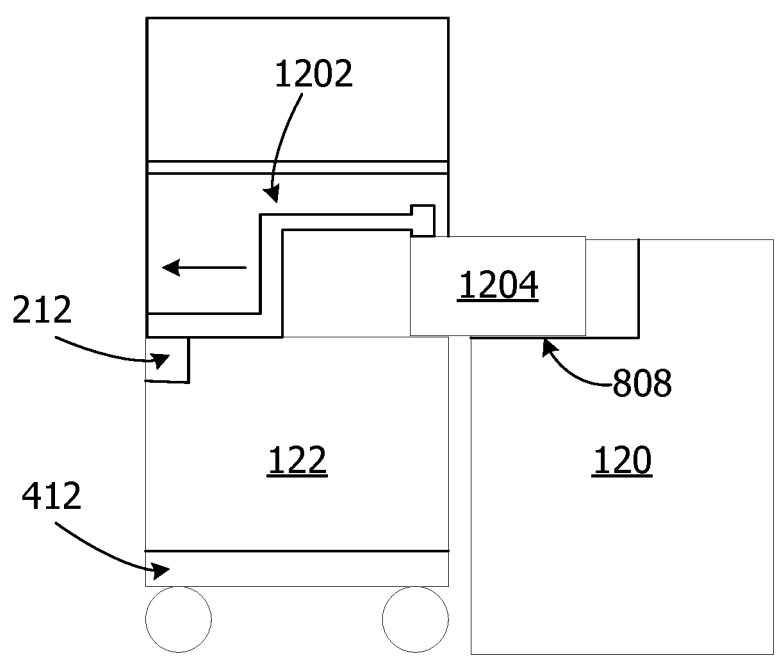
FIG. 12 is an exemplary block diagram illustrating a pull mechanism loading a tote onto a cart from an induction station.

FIG. 12 is an exemplary block diagram illustrating a pull mechanism 1202 loading a tote 1204 onto a cart 122 from an induction station 808. The push mechanism in this non-limiting example is an articulating robotic arm that grabs or latches onto the tote 1204 and pulls the tote away from the induction station 808 onto a shelf 1206 of the cart 122. Pull mechanism 1202 is an illustrative example of push/pull device 428 in set of actuators 420 of FIG. 4.

Figure 13:
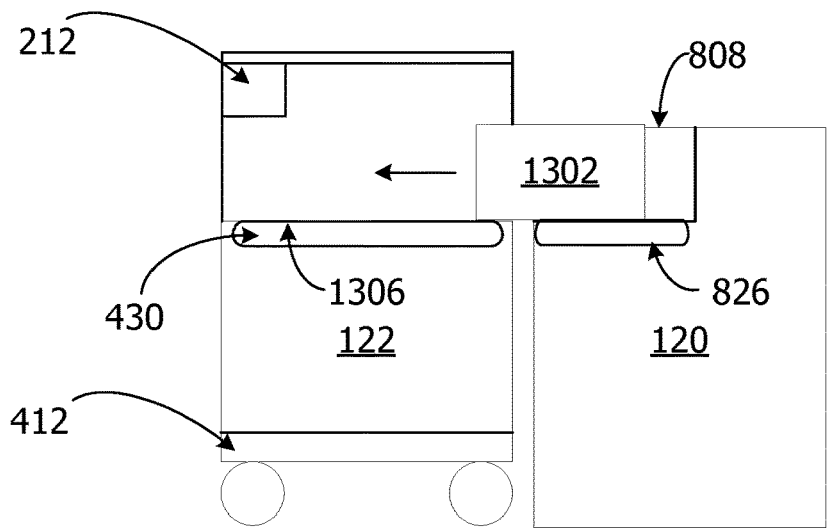
FIG. 13 is an exemplary block diagram illustrating a conveyor belt loading a tote onto a cart from an induction station on the container storage.

FIG. 13 is an exemplary block diagram illustrating a conveyor belt 430 loading a tote 1302 onto a cart 122 from an induction station 808 on the container storage 120. The conveyor belt(s) 826 on the container storage optionally move the tote 1302 into the induction station. The conveyor belt 430 on the cart pulls or carries the tote 1302 onto a shelf 1306 of the cart for conveyance away from the container storage 120. When the cart is fully loaded with totes, the cart can be taken to a pickup/receiving area or the cart can be loaded into a truck for delivery to another site (destination), such as, but not limited to, a pickup/receiving area, delivery address, etc. The system positions carts in the truck trailers so the cart to be delivered to the first stop is at back-end near the exit-point (door) of the trailer.

Figure 14:
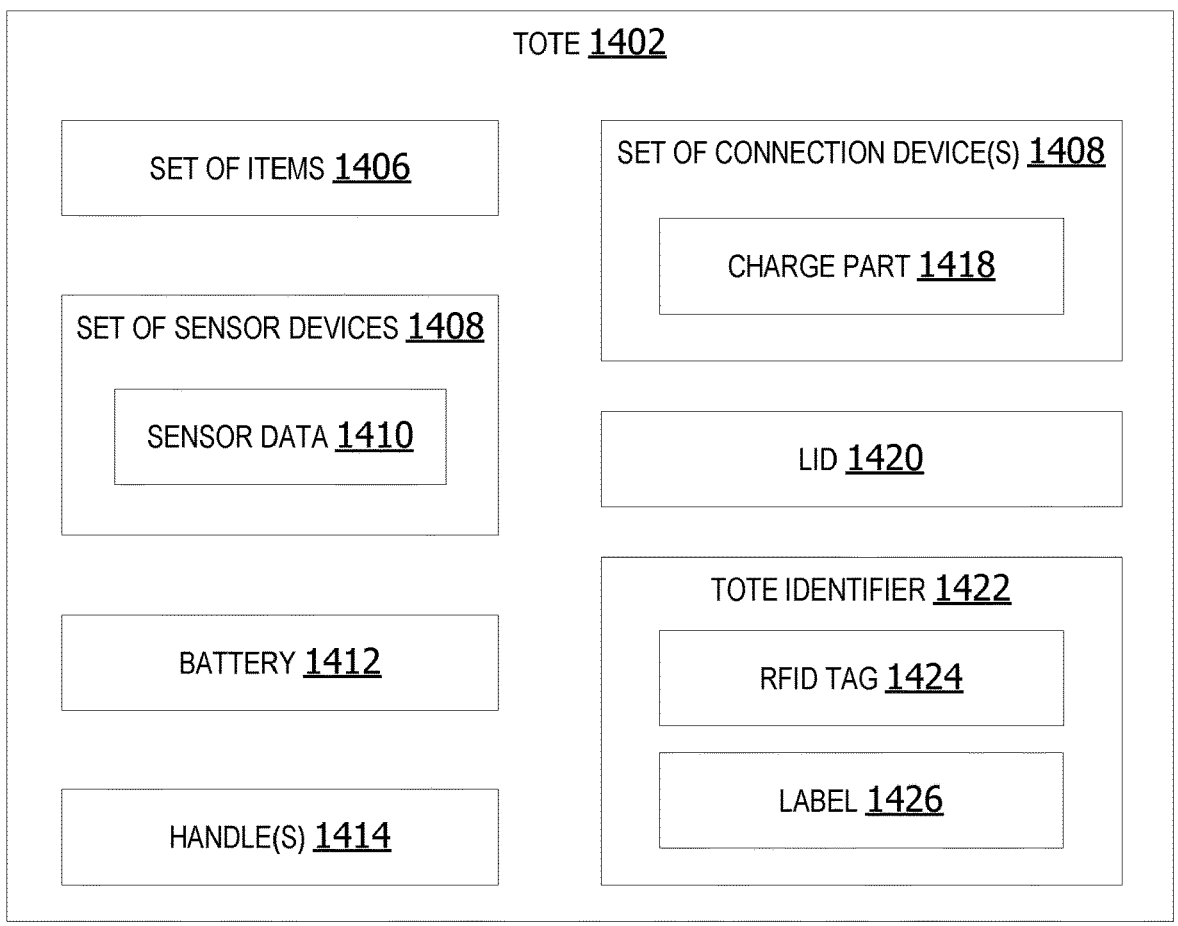
FIG. 14 is an exemplary block diagram illustrating a tote compatible with the container storage.

FIG. 14 is an exemplary block diagram illustrating a tote 1402 compatible with the container storage. The tote is any type of container for storing/holding a set of one or more items 1406. However, in some examples, the tote may be empty. In other words, the set of items 1406 inside the tote can be a null set.

A set of sensor devices 1408 can optionally be included within or on the tote to generate sensor data 1410 associated with conditions inside the tote, identify a location of the tote and/or identify items within the tote. The tote can include a battery 1412 for powering one or more of the sensor devices in the set of sensor devices. The set of sensor devices 1408 can be implemented as one or more devices in the set of sensor devices 118 in FIG. 1 and FIG. 15.

The tote 1402 can include one or more handle(s) 1414 enabling an actuator to attach to the tote 1402. The handle(s) can also provide a gripping member for a user to hold or lift the tote.

The tote can optionally include a set of one or more connection device(s) 1416 associated with one or more walls of the tote. A connection device can include any type of connector, such as, but not limited to, a battery charge port 1418 for recharging the battery 1412.

The tote in some non-limiting examples includes a lid 1420. The lid can be a hinged lid or a non-hinged lid that fits over a lip or rim of the tote. The tote can also include a tote identifier 1422 providing a unique identifier for each tote.

A tote identifier (ID) can be implemented as an RFID tag 1424, a label 1426 including text, numbers, (alphanumeric), symbols, barcodes, QR codes, or any other type of identifier. A sensor device scans the tote identifier to identify a tote and/or identify items to be placed into the tote, identify contents of the tote and/or identify items to be removed from the tote.

The system in some examples receives the tote ID 1422 from the cart 122 or may read it at the time of induction. In this non-limiting example, the system reads the tote ID at the induction station prior to loading the tote onto the cart. The tote ID 1422 in other examples is read after the tote is returned (unloaded) from the cart onto the induction station to verify the tote has been returned to the container storage.

The tote ID in other examples is utilized by the system to access tote-related data, such as, but not limited to, tote routing, tote contents (inventory), destination, cold-chain compliance rules (maximum temperature thresholds), and other data associated with the totes. The system can obtain the tote-related data by accessing a cloud storage (virtual database) or another local database via the network based on the tote ID for each tote. The tote IDs are used to control the flow of items and handoff/transfer of totes. The tote ID determines routing of totes, destination (where each tote should go) and tote inventory (tote contents).

Figure 15:
FIG. 15 is an exemplary block diagram illustrating set of sensor devices for generating sensor data associated with at least one tote.

FIG. 15 is an exemplary block diagram illustrating set of sensor devices 118 for generating sensor data associated with at least one tote. The set of sensor devices 118 in some examples includes a set of one or more temperature sensors 1502 for generating temperature data 1504 associated with one or more totes and/or one or more items within a tote. The temperature sensors can optionally also generate temperature data identifying the ambient temperature outside the cart, around the totes and/or the ambient temperature in one or more areas inside the container storage.

The set of sensor devices 118 in other examples includes a set of one or more hygrometers 1506 generating humidity data 1508 associated with humidity levels inside the container storage, inside a tote, or humidity associated with an ambient area around the cart.

A set of one or more weight sensors 1510 are optionally included on the cart. The set of weight sensors generate weight data 1512 generating weight data associated with one or more totes on the cart. The weight data is used to determine whether a tote has been loaded or unloaded onto the cart in the correct place and/or orientation on the cart. The weight data is used to validate items added into and subtracted from the totes by comparing changes in weight data with known weights of items added to each cart and/or items removed from each cart. The weight data can be used to validate correct loading or unloading of totes by comparing weight data generated by weight sensors on the cart with known weight of a tote being loaded or unloaded from the cart.

A set of one or more pressure sensors 1514 generating pressure data 1516 is included on the cart in some examples. The pressure data 1516 can be used to determine if a tote has been successfully loaded or unloaded from the cart. The data can also be used to determines if the tote has been loaded in the correct place and/or in the correct orientation.

The set of sensor devices 118 in some examples includes a set of one or more image capture devices 1518 generating image data 1520. An image capture device can include a camera, an infrared sensor, or any other type of imaging device. A camera can be included on the container storage, on the cart and/or at the receiving station (destination), such as on a truck, at a pickup location, or other location.

The set of sensor devices 118 can include a set of RFID tag readers 1522 generating RFID tag data 1524. An RFID tag reader generates RFID tag data obtained from one or more RFID tags on one or more totes in the set of totes being loaded onto a cart and/or loaded off of the cart.

The set of sensor devices 118 can optionally also include a barcode scanner 1526 for generating barcode scan data 1528 by scanning a barcode on a cart, on a tote or on an item inside a tote. The barcode can be a matrix barcode, a universal product code (UPC) code, a quick response (QR) code or any other type of code capable of being scanned by a scanning device.

In some examples, temperature data generating by a set of temperature sensors is used to manage temperature-sensitive items. To manage temperature of temperature-controlled containers, such as those containing frozen or chilled goods, the system reads a temperature control status and unloads (inducts) those totes off the cart and into a temperature-controlled storage area of the container storage before any ambient (non-temperature sensitive) totes At the time of induction, the temperature of each tote is known in other examples. The contents of each tote are also known. Each item and/or tote has associated with it a maximum acceptable temperature. This data is stored in a data storage, such as a database on the cart or on a server, such as the computing device 102 in FIG. 1. If the temperature of any tote is approaching (nearing) the maximum temperature threshold (high temperature limit) for that tote or any item in the tote, those totes are assigned the highest priority for induction (unloading off the cart).

The temperature of a tote or item in the tote can be determined in any one of several ways. In some examples, the container storage system reads/receives temperature data from a temperature sensor or reads a digital thermometer output or reading an analog thermometer using cameras. In other examples, the system receives a signal from the tote of the temperature of the contents of the tote. In still other examples, the cart receives/generates temperature data associated with a tote or the tote's contents via a temperature sensor on the cart or on the tote. The temperature data can be transmitted to a server, a cloud server, the cart and/or the container storage.

In still other examples, the cart is loaded in accordance with a tote priority based on temperature-sensitive contents of one or more totes. In these examples, temperature-controlled totes are loaded onto the cart last to minimize the amount of time a temperature-sensitive tote spends outside the temperature-controlled areas within the container storage.

In still other examples, weight data is utilized to determine a weight of a tote when empty and/or the weight of a tote including a set of items. The totes are loaded onto the cart such that the heaviest totes are on the bottom of the cart for stability in transport. The lightest weight totes are stored on the highest shelves.

Figure 16:
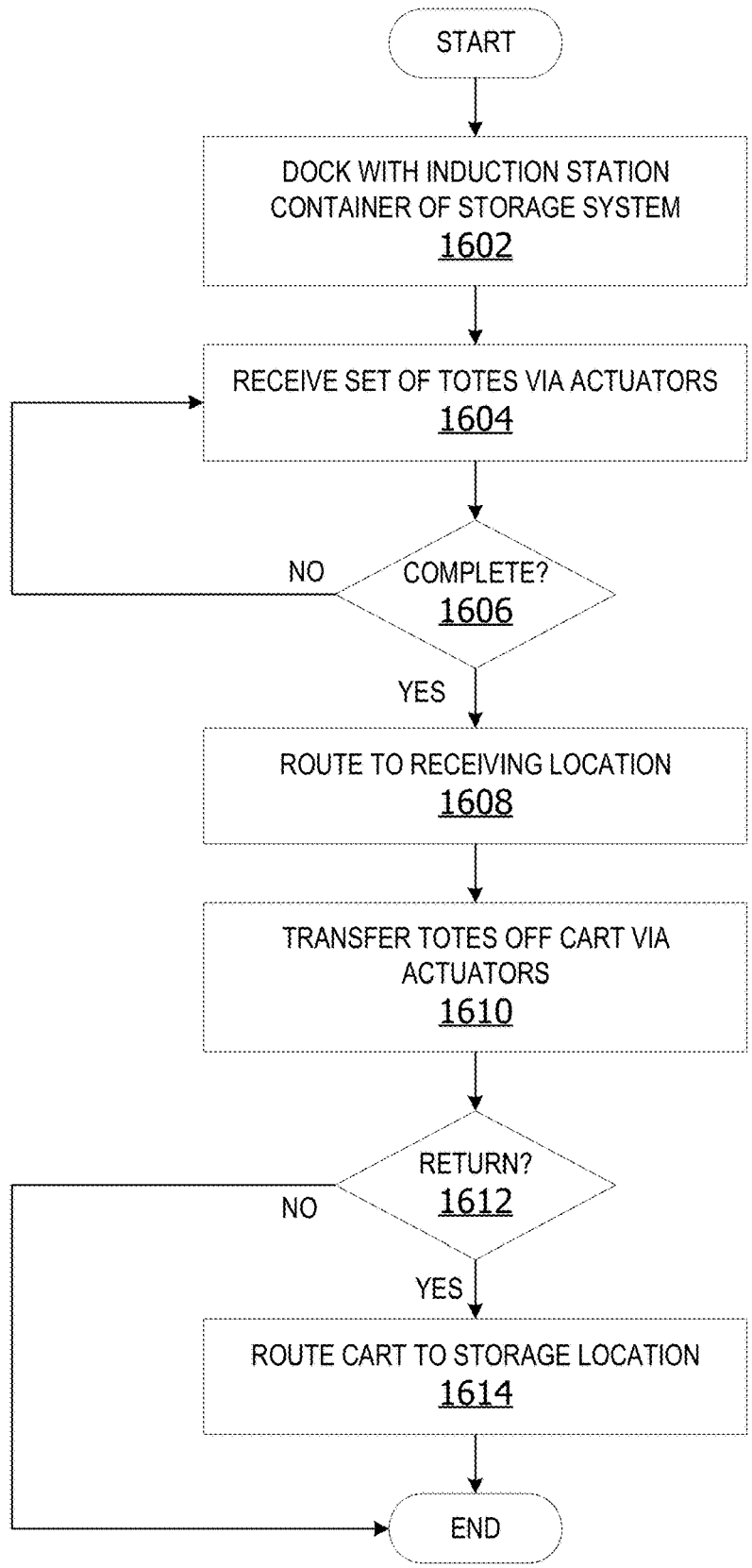
FIG. 16 is an exemplary flow chart illustrating operation of the container transport cart to autonomously load a set of totes.

FIG. 16 is an exemplary flow chart illustrating operation of the container transport cart to autonomously load a set of totes. The process shown in FIG. 16 is performed by a cart controller component, executing on a computing device, such as the computing device 102 or the smart container transport cart 400 in FIG. 4.

The process begins by docking with an induction station of a container storage system at 1602. The container storage system is a storage, such as, but not limited to, the container storage 120 in FIG. 1. The cart receives a set of totes via a set of actuators at 1604. The set of actuators push or pull the set of totes onto the cart without human intervention. The cart controller component determines if loading totes onto the cart is complete at 1606. If yes, the cart controller component identifies a route to a receiving location at 1608. The cart controller component can generate the route or receive routing data identifying the route from a cloud server, local server or other computing device via a network.

The cart in some examples self-navigates to the receiving location (destination). In other examples, a robotic towing device attaches to a portion of the cart and pushes, pulls or otherwise guides the cart to the receiving location.

The cart transfers the totes off the cart via the set of actuators at 1610. The cart controller component determines if the cart should return to the container storage location at 1612. If yes, the cart controller component routes the cart back to the storage location at 1614. The process terminates thereafter.

While the operations illustrated in FIG. 16 are performed by a computing device, aspects of the disclosure contemplate performance of the operations by other entities. In a non-limiting example, a cloud service performs one or more of the operations, such as, but not limited to, a service associated with the cloud server 116 in FIG. 1.

Figure 17:
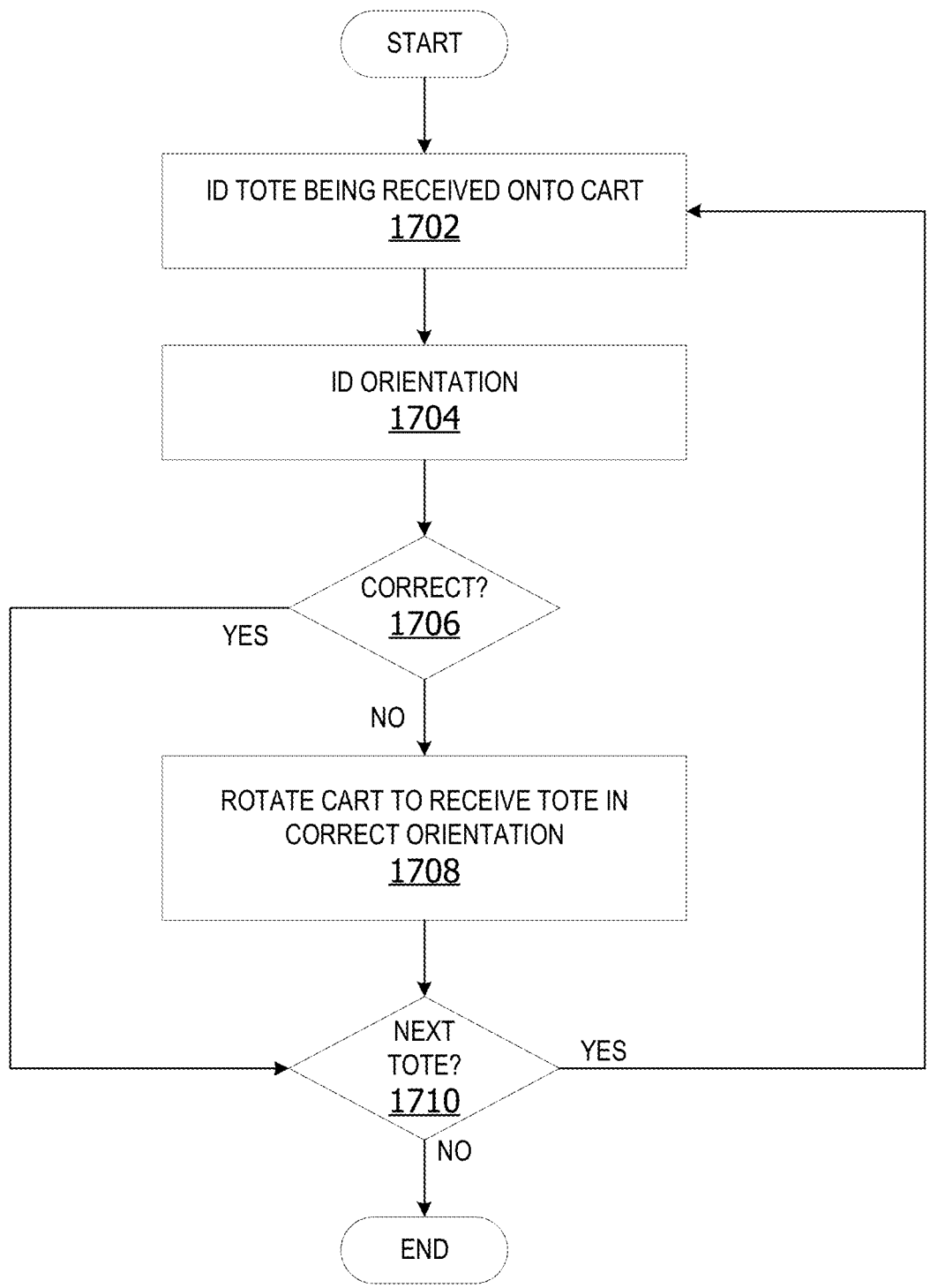
FIG. 17 is an exemplary flow chart illustrating operation of the container transport cart to manage orientation of a set of totes on the cart.

FIG. 17 is an exemplary flow chart illustrating operation of the container transport cart to manage orientation of a set of totes on the cart. The process shown in FIG. 17 is performed by a cart controller component, executing on a computing device, such as the computing device 102 or the smart container transport cart 400 in FIG. 4.

The process begins by identifying a tote being received (loaded) onto the cart at 1702. The cart controller component identifies the orientation of the tote at 1704. The cart controller component determines if the orientation is correct at 1706. If no, the cart controller component rotates the cart to receive the tote in the correct orientation at 1708. The cart controller component determines if there is a next tote to be loaded onto the cart at 1710. If yes, the process returns to 1702 and iteratively executes steps 1702 through 1710 until all the totes are loaded onto the cart in the correct orientation. The process terminates thereafter.

While the operations illustrated in FIG. 17 are performed by a computing device, aspects of the disclosure contemplate performance of the operations by other entities. In a non-limiting example, a cloud service performs one or more of the operations, such as, but not limited to, a service associated with the cloud server 116 in FIG. 1.

Figure 18:
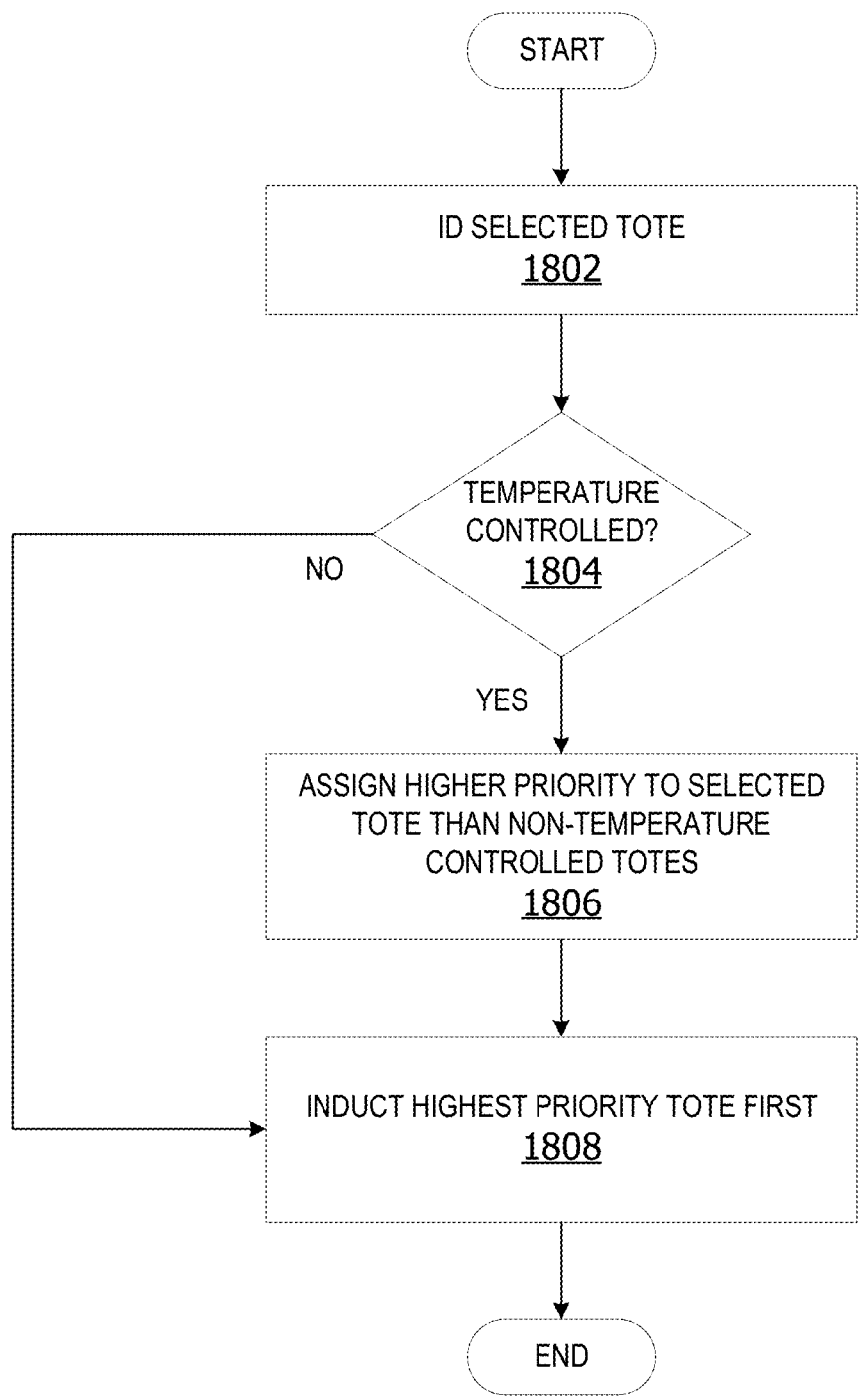
FIG. 18 is an exemplary flow chart illustrating operation of the container transport cart to prioritize loading or unloading of totes onto the cart.

FIG. 18 is an exemplary flow chart illustrating operation of the container transport cart to prioritize loading or unloading of totes onto the cart. The process shown in FIG. 18 is performed by a cart controller component, executing on a computing device, such as the computing device 102 or the smart container transport cart 400 in FIG. 4.

The process begins by identifying a selected tote at 1802. The cart controller component determines if the tote is temperature-controlled at 1804. If yes, the cart controller component assigns a higher priority to the selected tote than to non-temperature-controlled totes 1806. The highest priority tote is inducted (unloaded) off the tote first at 1808. The process terminates thereafter.

In this example, the highest priority tote is unloaded first. In other examples, the highest priority tote (temperature-controlled tote) is loaded onto the cart last so that temperature-sensitive items remain in temperature-controlled areas within the container storage for as long as possible prior to loading the totes onto the cart.

While the operations illustrated in FIG. 18 are performed by a computing device, aspects of the disclosure contemplate performance of the operations by other entities. In a non-limiting example, a cloud service performs one or more of the operations, such as, but not limited to, a service associated with the cloud server 116 in FIG. 1.

Additional Examples

In some examples, the system automates the processes of fulfilling orders and stocking a retail store via interfaces between various automated systems. In some examples, the system includes conveyors and carts for automatically transporting totes on a cart or other conveyance device between a pickup location and a drop off location. The system coordinates the conveyors and carts involved with the automation. In this manner, the system provides integration to load and unload totes from a container storage device autonomously without human intervention.

In some examples, the system provides fully automated loading and un-loading totes onto a conveyance (cart) system to and from the container storage system for automatic induction and retrievable totes. This enables autonomous storage, retrieval and delivery of totes from the storage location to the pickup point.

Some totes have special provisions and as such are not symmetric. These special provisions may include, without limitation, openings, ports, plugs, receptacles, etc. The special provisions (connections) are located in specific locations on the walls of the totes. The totes are placed in a predetermined orientation on the cart to ensure these features on the totes are properly aligned when stored in the storage system or in the transport vehicle.

In some examples, the totes on a given cart are all oriented the same way on the cart, so when handed off, all totes are aligned properly. When the cart is to be docked into a truck, all the totes' respective features are aligned so the connectors can be plugged in, affixed to a power supply, attached to a heating, ventilation and/or air conditioning (HVAC) system on the truck. The cart can navigate/park against all the truck's connection points allowing the totes on the cart to attach to the correct connection devices on the truck.

If some totes are oriented properly and others are rotated one-hundred and eight degrees (180°), the robotic cart towing device can turn the cart around, if necessary, during loading/unloading so the totes are all inducted (loaded onto the cart) or removed (unloaded from the cart) in the same orientation, such that all the connectors on the totes are facing the same direction.

In other examples, a self-propelled smart cart undocks and spins itself to compensate if a tote being loaded or unloaded is oriented incorrectly. Instead of relying on the towing robot, the smart cart determines the correct position of the cart necessary to ensure a tote being loaded or unloaded ends up facing the correct direction/orientation on the cart.

The system can also be used in between picking products off sales floor/warehouse/backroom and delivery to the storage system. In other examples, autonomous robotic devices are used when picking items off the sales floor or from the backroom/warehouse for order fulfillment. The totes containing the order fulfillment items are then transferred to the storage system via the container conveyance system using the carts and/or robotic cart towing devices.

The totes in other examples include ports (recharge ports), battery, openings, ports, plugs, and/or receptacles. These features are for recharging the battery, powering sensors, cooling/controlling temperature inside the tote, controlling humidity inside the tote, or otherwise self-regulating temperature or other conditions. The smart totes can also generate/gather sensor data, inventory data, battery power level data, and other information. This data can be transmitted to the server, container storage, cart or other computing device. Thus, the tote or the cart can server as a data gathering point within the Internet of Things (IoT).

In an example scenario, the system deploys carts from a truck in a residential neighborhood with stand-alone storage containers. The autonomous container transport carts drive-up and unload one or more totes automatically into the customers domicile, such as, at a mailbox, pick-up kiosk, locker system, or other pickup location/receptacle. The cart then continues on to the next domicile/destination for tote delivery.

In another example, the system scans a tote label or tote ID when the tote is unloaded off the cart onto the induction station. The system verifies the full/stocked tote is taken off the cart and inducted. The verification notification is sent back to the server. An inventory or other order fulfillment record is updated to reflect induction of the tote into the container storage.

At least a portion of the functionality of the various elements in FIG. 1, FIG. 2, FIG. 3, FIG. 4, FIG. 5, FIG. 6, FIG. 7, FIG. 8, FIG. 9, FIG. 10, FIG. 11, FIG. 12, FIG. 13, FIG. 14 and FIG. 15 can be performed by other elements in FIG. 1, FIG. 2, FIG. 3, FIG. 4, FIG. 5, FIG. 6, FIG. 7, FIG. 8, FIG. 9, FIG. 10, FIG. 11, FIG. 12, FIG. 13, FIG. 14 and FIG. 15, or an entity (e.g., processor 106, web service, server, application program, computing device, etc.) not shown in FIG. 1, FIG. 2, FIG. 3, FIG. 4, FIG. 5, FIG. 6, FIG. 7, FIG. 8, FIG. 9, FIG. 10, FIG. 11, FIG. 12, FIG. 13, FIG. 14 and FIG. 15.

In some examples, the operations illustrated in FIG. 16, FIG. 17 and FIG. 18 can be implemented as software instructions encoded on a computer-readable medium, in hardware programmed or designed to perform the operations, or both. For example, aspects of the disclosure can be implemented as a system on a chip or other circuitry including a plurality of interconnected, electrically conductive elements.

While the aspects of the disclosure have been described in terms of various examples with their associated operations, a person skilled in the art would appreciate that a combination of operations from any number of different examples is also within scope of the aspects of the disclosure.

The term "Wi-Fi" as used herein refers, in some examples, to a wireless local area network using high frequency radio signals for the transmission of data. The term "BLUETOOTH®" as used herein refers, in some examples, to a wireless technology standard for exchanging data over short distances using short wavelength radio transmission. The term "cellular" as used herein refers, in some examples, to a wireless communication system using short-range radio stations that, when joined together, enable the transmission of data over a wide geographic area. The term "NFC" as used herein refers, in some examples, to a short-range high frequency wireless communication technology for the exchange of data over short distances.

Exemplary Operating Environment

Exemplary computer-readable media include flash memory drives, digital versatile discs (DVDs), compact discs (CDs), floppy disks, and tape cassettes. By way of example and not limitation, computer-readable media comprise computer storage media and communication media. Computer storage media include volatile and nonvolatile, removable and non-removable media implemented in any method or technology for storage of information such as computer-readable instructions, data structures, program modules and the like. Computer storage media are tangible and mutually exclusive to communication media. Computer storage media are implemented in hardware and exclude carrier waves and propagated signals. Computer storage media for purposes of this disclosure are not signals per se. Exemplary computer storage media include hard disks, flash drives, and other solid-state memory. In contrast, communication media typically embody computer-readable instructions, data structures, program modules, or the like, in a modulated data signal such as a carrier wave or other transport mechanism and include any information delivery media.

Although described in connection with an exemplary computing system environment, examples of the disclosure are capable of implementation with numerous other general purpose or special purpose computing system environments, configurations, or devices.

Examples of well-known computing systems, environments, and/or configurations that can be suitable for use with aspects of the disclosure include, but are not limited to, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. Such systems or devices can accept input from the user in any way, including from input devices such as a keyboard or pointing device, via gesture input, proximity input (such as by hovering), and/or via voice input.

Examples of the disclosure can be described in the general context of computer-executable instructions, such as program modules, executed by one or more computers or other devices in software, firmware, hardware, or a combination thereof. The computer-executable instructions can be organized into one or more computer-executable components or modules. Generally, program modules include, but are not limited to, routines, programs, objects, components, and data structures that perform tasks or implement abstract data types. Aspects of the disclosure can be implemented with any number and organization of such components or modules. For example, aspects of the disclosure are not limited to the specific computer-executable instructions or the specific components or modules illustrated in the figures and described herein. Other examples of the disclosure can include different computer-executable instructions or components having more functionality or less functionality than illustrated and described herein.

In examples involving a general-purpose computer, aspects of the disclosure transform the general-purpose computer into a special-purpose computing device when configured to execute the instructions described herein.

The examples illustrated and described herein as well as examples not specifically described herein but within the scope of aspects of the disclosure constitute exemplary means for automated conveyance of totes from a container storage system to a pickup/retrieval station via smart container transport carts and/or robotic cart towing devices. For example, the elements illustrated in FIG. 1, FIG. 2, FIG. 3, FIG. 4, FIG. 5, FIG. 6, FIG. 7, FIG. 8, FIG. 9, FIG. 10, FIG. 11, FIG. 12, FIG. 13, FIG. 14 and FIG. 15, such as when encoded to perform the operations illustrated in FIG. 16, FIG. 17 and FIG. 18, constitute exemplary means for identifying a tote, exemplary means for loading the identified tote onto the cart from an induction station on the container storage, and exemplary means for transporting the tote to a receiving station or other pickup/delivery location.

Other non-limiting examples provide one or more computer storage devices having a first computer-executable instructions stored thereon for providing conveyance of totes from an induction station on a container storage to a receiving station (destination) via smart carts and/or robotic cart towing devices. When executed by a computer, the computer performs operations including identifying a tote for induction into a container storage based on a tote ID; moving the identified tote off a surface of the cart onto the induction station via a set of actuators; updating a cart inventory; scanning the tote after unloading to verify induction; and sending a verification notification to a remote computing device.

The order of execution or performance of the operations in examples of the disclosure illustrated and described herein is not essential, unless otherwise specified. That is, the operations can be performed in any order, unless otherwise specified, and examples of the disclosure can include additional or fewer operations than those disclosed herein. For example, it is contemplated that executing or performing an operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there can be additional elements other than the listed elements. The term "exemplary" is intended to mean "an example of." The phrase "one or more of the following: A, B, and C" means "at least one of A and/or at least one of B and/or at least one of C."

In an exemplary embodiment, one or more of the exemplary embodiments include one or more localized Internet of Things (IoT) devices and controllers. As a result, in an exemplary embodiment, the localized IoT devices and controllers can perform most, if not all, of the computational load and associated monitoring and then later asynchronous uploading of summary data can be performed by a designated one of the IoT devices to a remote server. In this manner, the computational effort of the overall system can be reduced significantly. For example, whenever localized monitoring allows remote transmission, secondary utilization of controllers keeps securing data for other IoT devices and permits periodic asynchronous uploading of the summary data to the remote server. In addition, in an exemplary embodiment, the periodic asynchronous uploading of summary data can include a key kernel index summary of the data as created under nominal conditions. In an exemplary embodiment, the kernel encodes relatively recently acquired intermittent data ("KRI"). As a result, in an exemplary embodiment, KRI includes a continuously utilized near term source of data, but KRI can be discarded depending upon the degree to which such KRI has any value based on local processing and evaluation of such KRI. In an exemplary embodiment, KRI may not even be utilized in any form if it is determined that KRI is transient and can be considered as signal noise. Furthermore, in an exemplary embodiment, the kernel rejects generic data to provide a modified kernel ("KRG") by filtering incoming raw data using a stochastic filter that thereby provides a predictive model of one or more future states of the system and can thereby filter out data that is not consistent with the modeled future states which can, for example, reflect generic background data. In an exemplary embodiment, KRG incrementally sequences all future undefined cached kernels of data to filter out data that can reflect generic background data. In an exemplary embodiment, KRG further incrementally sequences all future undefined cached kernels having encoded asynchronous data to filter out data that can reflect generic background data.

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system for integrated container conveyance, the system comprising:

a smart container conveyance cart comprising a removable set of totes associated with a set of shelves on the smart container conveyance cart, each tote of the removable set of totes including an individual tote ID;
a set of sensor devices implemented on the smart container conveyance cart, including at least one sensor for scanning the individual tote ID of a first tote to identify the first tote for unloading into an induction station on a container storage, and at least one temperature sensor for sensing temperature including ambient temperature or temperature within one or more totes of the removable set of totes;
a set of actuators associated with the smart container conveyance cart configured to move the identified first tote off at least one shelf in the set of shelves of the smart container conveyance cart onto a receiving platform of the induction station; and
a cart controller component, implemented on a control device of the smart container conveyance cart, that controls autonomous loading and unloading of the removable set of totes via the set of actuators, analyzes sensor data generated by the set of sensor devices implemented on the smart container conveyance cart to determine a priority for unloading individual totes of the removable set of totes based on temperature thresholds assigned to the one or more totes and verify induction of the first tote into the container storage.

2. The system of claim 1, further comprising:
a second set of sensor devices associated with the removable set of totes, at least one sensor device of the second set of sensor devices generating additional sensor data associated with a second tote on the induction station,
wherein the cart controller component analyzes the additional sensor data to identify the second tote, and controls the set of actuators to move the second tote from the induction station on the container storage onto at least one shelf of the smart container conveyance cart.

3. The system of claim 1, further comprising:
a data storage device storing a cart inventory, wherein the cart controller component updates the cart inventory to reflect induction of the first tote off the smart container conveyance cart and onto the container storage.

4. The system of claim 1, wherein the receiving platform comprises an induction drawer including a set of tote induction slots and further comprising:
a first set of actuators in the set of actuators associated with the smart container conveyance cart pushes a first selected tote in the removable set of totes off the smart container conveyance cart into a first induction slot in the set of induction slots within the induction drawer; and
a second set of actuators in the set of actuators associated with the smart container conveyance cart pushes a second selected tote in the removable set of totes off the smart container conveyance cart into a second induction slot in the set of induction slots within the induction drawer.

5. The system of claim 1, wherein the set of actuators associated with the smart container conveyance cart further comprise a first actuator device and a second actuator device, the set of actuators further configured to pull a third tote in the removable set of totes off the receiving platform and onto the smart container conveyance cart.

6. The system of claim 1, wherein the smart container conveyance cart further comprises:
a braking system coupled to a set of rollers;
a set of weight sensors for determining an amount of weight on the smart container conveyance cart,
wherein the cart controller component engages the braking system on condition the amount of weight on the smart container conveyance cart exceeds a maximum weight threshold.

7. The system of claim 1 wherein the cart controller component aligns the smart container conveyance cart with the induction station on the container storage.

8. The system of claim 1, further comprising:
a network device on the smart container conveyance cart, wherein the network device is configured to receive a set of instructions associated with unloading a set of totes at the induction station.

9. A computer implemented method for integrated container conveyance, the computer-implemented method comprising:
identifying, via a set of sensor devices implemented on a smart container conveyance cart, at least two totes located on the smart container conveyance cart for induction into a container storage at a selected induction station based on individual tote IDs associated with the identified at least two totes;
monitoring, via at least one temperature sensor of the set of sensor devices, a temperature of at least one of the at least two totes located on the smart container conveyance cart to manage temperature-sensitive items in the at least one tote;
determining, via a cart controller component implemented on the smart container conveyance cart, a priority for unloading the at least two totes, wherein a higher priority is given to totes approaching a maximum temperature threshold assigned to a given tote;
aligning, via the cart controller component, the smart container conveyance cart with the selected induction station for transfer of the at least one monitored tote from the smart container conveyance cart onto the selected induction station based on the priority determined by the cart controller component; and
moving, via a set of actuators implemented on the smart container conveyance cart, the at least one monitored tote off a surface of at least one shelf of the smart container conveyance cart onto a receiving area of the selected induction station associated with the container storage.

10. The computer implemented method of claim 9, further comprising:
scanning the identified tote after unloading to verify induction; and
sending a verification notification to a remote computing device.

11. The computer implemented method of claim 9, further comprising:
updating a cart inventory to reflect induction of the identified tote into the container storage.

12. The computer implemented method of claim 9, further comprising:
loading a set of stocked totes from the selected induction station onto the smart container conveyance cart;
generating a route from the container storage to a receiving station; and
conveying the set of stocked totes from the selected induction station to the receiving station via at least one motor on the smart container conveyance cart.

13. The computer implemented method of claim 12 further comprising:

obtaining a maximum temperature threshold for each tote in the set of stocked totes loaded onto the smart container conveyance cart; and monitoring, by the at least one temperature sensor of the set of sensor devices implemented on the smart container conveyance cart, the set of stocked totes during the conveyance.

14. An integrated container conveyance device comprising:

a cart comprising a set of shelves configured to accommodate a set of totes, each tote in the set of totes including an individual tote ID;

at least one temperature sensor implemented on the cart that obtains temperature data including ambient temperature or temperature within one or more totes of the set of totes;

at least one sensor configured to scan the individual tote ID of the each tote in the set of totes;

a docking member on the cart;

a set of actuators associated with the cart;

a cart control device configured to align the cart with an induction station on a container storage for loading and unloading of the set of totes via the set of actuators; and a cart controller component configured to analyze the obtained temperature data to determine a priority for the unloading based on temperature thresholds assigned to the one or more totes.

15. The integrated container conveyance device of claim 14, wherein the cart controller component further obtains a temperature threshold for each tote in the one or more totes and monitors the one or more totes during conveyance based on the obtained temperature data.

16. The integrated container conveyance device of claim 14 further comprising:

a data storage device storing a cart inventory, wherein the cart controller component updates the cart inventory to reflect induction of a first tote off the cart and onto the container storage.

17. The integrated container conveyance device of claim 14 wherein the set of actuators further comprises:

a first set of actuators associated with a first set of totes on a shelf at a first level on the integrated container conveyance device, wherein the first set of actuators are configured to move the first set of totes off the integrated container conveyance device at the induction station.

18. The integrated container conveyance device of claim 17 further comprising:

a second set of actuators associated with a second set of totes on a shelf at a second level on the integrated container conveyance device, wherein the second set of actuators are configured to move the second set of totes off the integrated container conveyance device and onto the induction station.

19. The integrated container conveyance device of claim 14 further comprising:

a braking system coupled to a set of rollers;

a set of weight sensors generating weight data associated with an amount of weight on the integrated container conveyance cart; and a cart controller component, wherein the cart controller component engages the braking system on condition the amount of weight on the cart exceeds a maximum weight threshold.

20. The integrated container conveyance device of claim 14 further comprising:

an auto-navigation system configured to auto-navigate the cart within an induction area via geolocation.

* * * * *